US012780533B2

(12) United States Patent
Parkins

(10) Patent No.: US 12,780,533 B2
(45) Date of Patent: Nov. 3, 2026

(54) SHIPPING CONTAINER

(71) Applicant: John Peter Parkins, Hanover (DE)

(72) Inventor: John Peter Parkins, Hanover (DE)

( * ) Notice: Subject to any disclaimer, the term of this patent is extended or adjusted under 35 U.S.C. 154(b) by 31 days.

(21) Appl. No.: 19/109,323

(22) PCT Filed: Sep. 6, 2023

(86) PCT No.: PCT/GB2023/052294
§ 371 (c)(1),
(2) Date: Mar. 6, 2025

(87) PCT Pub. No.: WO2024/052664
PCT Pub. Date: Mar. 14, 2024

(65) Prior Publication Data
US 2026/0084894 A1 Mar. 26, 2026

(30) Foreign Application Priority Data
Sep. 6, 2022 (GB) ..................................... 2212973

(51) Int. Cl.
*G08B 21/00* (2006.01)
*B65D 88/12* (2006.01)
*B65D 90/00* (2006.01)
*B65D 90/22* (2006.01)
*B65D 90/48* (2006.01)
*G08B 13/08* (2006.01)

(52) U.S. Cl.
CPC ........... *B65D 90/22* (2013.01); *B65D 88/121* (2013.01); *B65D 90/008* (2013.01); *B65D 90/48* (2013.01); *G08B 13/08* (2013.01)

(58) Field of Classification Search
CPC .... B65D 90/22; B65D 88/121; B65D 90/008; B65D 90/48; G08B 13/08
USPC ....................................................... 340/539.1
See application file for complete search history.

(56) References Cited

U.S. PATENT DOCUMENTS

2004/0196153 A1* 10/2004 Cockburn ........... B60R 25/1004 340/539.1
2004/0227630 A1 11/2004 Shannon et al.
(Continued)

FOREIGN PATENT DOCUMENTS

CN 2 690 345 Y 4/2005
DE 10 2012 201021 A1 7/2013

OTHER PUBLICATIONS

International Search Report dated Mar. 25, 2024 issued in PCT/GB2023/052294.
Written Opinion dated Mar. 25, 2024 issued in PCT/GB2023/052294.

*Primary Examiner* — Mark S Rushing
(74) *Attorney, Agent, or Firm* — Blank Rome LLP

(57) ABSTRACT

A shipping container the comprises a container body for containing goods. First and second doors are positioned at a first end of the container body, and move between open and closed positions for enabling storage and removal of the goods from the container body. Locking bars extend longitudinally along the outside of the doors and which operate to lock and unlock the doors. At least one sensor device is mounted on at least one of the locking bars, and operates wirelessly to transmit to a control station data indicating an unauthorized attempt to open at least one of the doors. At least one global positioning satellite device is mounted on at least one of the locking bars, and operates to indicate the global position of the container.

14 Claims, 9 Drawing Sheets

(56) References Cited

U.S. PATENT DOCUMENTS

| | | | | |
|---|---|---|---|---|
| 2009/0102653 | A1* | 4/2009 | McGinnis | G06Q 10/087 705/28 |
| 2011/0018707 | A1* | 1/2011 | Dobson | G08B 13/08 340/572.1 |
| 2014/0225744 | A1* | 8/2014 | Claris | B65D 90/008 428/106 |
| 2015/0287297 | A1* | 10/2015 | Harrison | E05B 83/10 340/8.1 |

* cited by examiner

SHIPPING CONTAINER

CROSS-REFERENCE TO RELATED APPLICATIONS

This application is a National Stage of International Patent Application No. PCT/GB2023/052294, filed Sep. 6, 2023, which claims foreign priority to GB Application No. 2212973.8, filed Sep. 6, 2022, the disclosures of which are hereby incorporated by reference in their entireties.

This invention relates to a shipping container.

BACKGROUND

Shipping containers are widely used for transporting goods between different countries. It is estimated that there are currently 70 million shipping containers in use worldwide. The shipping containers comprise a container body for containing goods, and first and second doors which are positioned at a first end of the container body, and which move between open and closed positions for enabling storage and removal of the goods from the container body. Locking bars extend longitudinally along the outside of the doors, and these locking bars operate to lock and unlock the doors. In spite of the locking bars and also in spite of seals such as Customs seals, it often happens that the containers are tampered with, for example for the purpose of stealing goods from inside the container body, or alternatively for inserting goods into the container body. The inserted goods may be, for example, drugs or people such as illegal immigrants.

SUMMARY

It is an aim of the present invention to reduce the above mentioned problem.

Accordingly, in one non-limiting embodiment of the present invention there is provided a shipping container comprising:

(i) a container body for containing goods;

(ii) first and second doors which are positioned at a first end of the container body, and which move between open and closed positions for enabling storage and removal of the goods from the container body;

(iii) locking bars which extend longitudinally along the outside of the doors and which operate to lock and unlock the doors;

(iv) at least one sensor device which is mounted on at least one of the locking bars, and which operates wirelessly to transmit to a control station data indicating an unauthorised attempt to open at least one of the doors; and (v) at least one global positioning satellite device which is mounted on at least one of the locking bars, and which operates to indicate the global position of the container.

The control station may be that of a recognised authority such for example as a Customs authority, another type of state-controlled authority, or a private security firm. The wireless transmission may typically be a telecommunications transmission. The global positioning satellite (GPS) device may operate in the same way as known GPS devices.

The shipping container may be one in which there is more than one of the locking bars on each of the first and second doors. In general there may be one or more of the sensor devices positioned on one or more chosen locking bars. Similarly there may be one or more GPS devices on one or more of chosen locking bars. The shipping container may thus have one or more sensor devices and one more GPS devices as appropriate for indicating the unauthorised attempt to open at least one of the doors, and the global position of the container.

The shipping container may be one in which there is a first one of the sensor device on a first locking bar for the first door, and in which there is a second one of the sensor devices on a second locking bar for the second door. In this case, the sensor devices may be in communication with each other such as to trigger in response to unauthorised relative movement between the first and the second doors. Alternatively, or additionally, the first and second sensor devices may trigger in response to other events such for example as tampering with a closure seal, or attempting to circumvent the sensor devices in some way which is other than by the unauthorised relative movement between the first and the second doors.

The shipping container may be one in which there is a first one of the GPS devices on one of the locking bars of the first door. Alternatively or additionally, the shipping container may be one in which there is a second one of the GPS devices on one of the locking bars for the second door.

The GPS device is preferably formed as part of the sensor device. If desired however the GPS device may be separately formed from the sensor device. If the GPS device is separately formed from the sensor device, then the GPS device may be on the same locking bar as the sensor device, or on a different locking bar as the sensor device. From a manufacturing aspect, it is preferred that the GPS device is formed as part of the sensor device. There is then only one unit that needs to be manufactured, and this unit can be manufactured to be easily installed on the chosen locking bar. If each unit has one of the GPS devices, then extra security is provided if there are two of the security devices on the shipping container. More specifically, if one of the GPS devices should fail, then the other GPS device will still be able to provide the global position of the container.

The shipping container may be one in which the first end of the container body has a corner abutment member at each of four corners of the first end of the container body, in which the first and second doors have at least one transversely extending recessed portion, and in which the sensor device is mounted on the locking bar on a part of the locking bar that passes over the transversely extending recessed portion, whereby the sensor device is mounted in a protection space created by the depth of the transversely extending recessed portion and the thickness of the corner abutment member.

The shipping container may be one in which the sensor device comprises a first part and a second part, and securing means for securing the first and second parts together around the locking bar.

The securing means may comprise a plurality of securing pins. Each one of the securing pins may have a male member which projects into a female member, and in which the male member is wirelessly electronically controllable to move it from a locked position in the female member to an unlocked position out of the female member. Such securing pins provide increased security against an attempt to remove the securing pins. The male member may be operated by a code, for example a seven digit code.

The pins may be mounted on one or more metal support plates. Such a construction gives good strength.

The shipping container may be one in which the sensor device is configured such that electronic components in the sensor device are protected from adverse environmental conditions. The adverse environmental conditions may be, for example, rainwater, seawater and shocks.

The electronic components may be in an inner plastics moulded portion, and the inner plastics moulded portion may be protected by an outer plastics moulded portion. When the sensor device includes the pins mounted on the metal support plate or plates, then the metal support plate or plates can be provided in the outer moulding. Any suitable and appropriate plastics materials may be employed for the inner and outer plastics moulded portions. The same or different materials can be used for the inner and outer plastics moulded portions. The inner and outer plastics moulded portions will typically be made of a plastics material that is able to resist against the adverse environmental conditions, and that is of a thickness and a type of construction that helps to resist against the adverse environmental conditions.

The GPS device may be activatable in the event that the container should fall off a ship if the container is being transported by the ship. This is advantageous in that, if the container should be floating in a nearly submerged condition, it would normally be difficult if not impossible to see the container from other ships. However, if the GPS device is activated, then the position of the floating container is able to be notified to shipping in the vicinity, so that the ships will not inadvertently strike the floating container and perhaps be damaged or sunk by the container.

The sensor device may advantageously be one which is able to transmit a picture of the inside of the container, before and after opening of the container and for comparison purposes. This may help the appropriate authorities, for example Customs authorities, to see if anything has been added to or taken from the container during transit.

Generally, the sensor device may be constructed to transmit any required details of the goods in the container. The sensor device may transmit data which gives information which is much more comprehensive than that which would be obtainable using a simple bar code.

The shipping container may be one in which there is a first one of the sensor devices on the first door, a second one of the sensor devices on the second door, and in which there is a security rod extending between the first and second sensor devices. The sensor rod will normally be only be removable in an authorised manner when it is desired to open the first and second doors. Thus the security rod provides extra security.

BRIEF DESCRIPTION OF THE DRAWINGS

Embodiments of the invention will now be described solely by way of example and with reference to the accompanying drawings in which.

DETAILED DESCRIPTION

Figure 1:
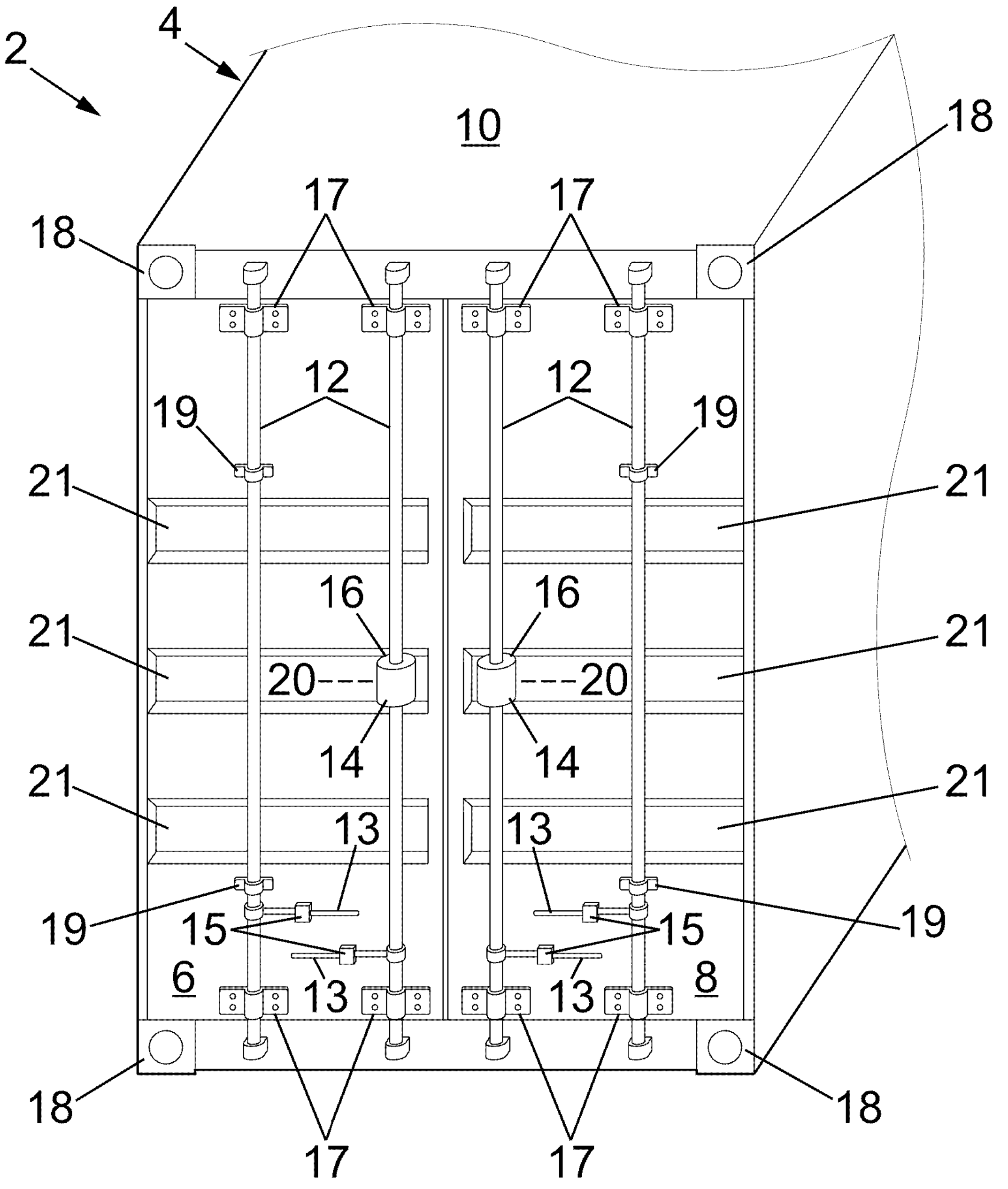
FIG. 1 shows a front part of a first shipping container of the invention.

Referring to FIG. 1, there is shown a shipping container 2 comprising a container body 4. First and second doors 6, 8 are positioned at a first end 10 of the container body 4. The first and second doors 6, 8 move between open and closed positions for enabling storage and removal of the goods from the container body 4. Locking bars 12 extend longitudinally and vertically along the outside of the doors 6, 8. The locking bars 12 operate to lock and unlock the doors 6, 8. More specifically, the locking bars 12 have hard grips 13 which enable the locking bars 12 to be rotated and moved from their door-locking position shown in FIG. 1 to their door-unlocking position in which the doors 6, 8 are able to be opened. In their door-locking position the doors 6, 8 are locked in locking members 15. The locking bars 12 rotate in retaining members 17 and 19.

Figure 2:
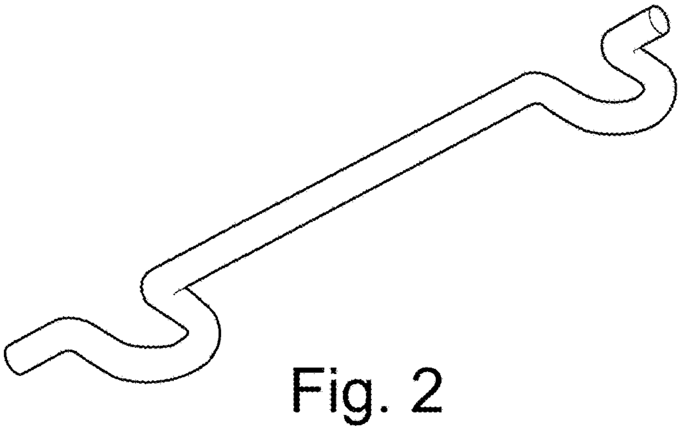
FIGS. 2 to 4 show a security bar assembly operating to secure the doors of the container.
Figure 3:
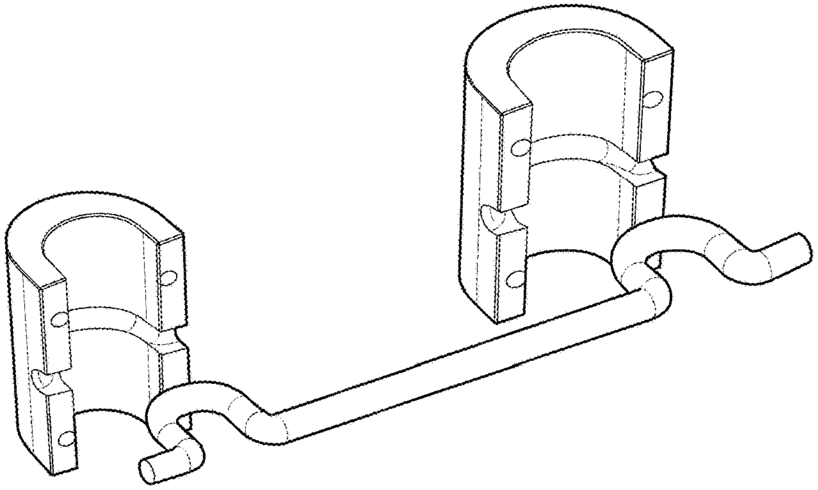
Figure 4:
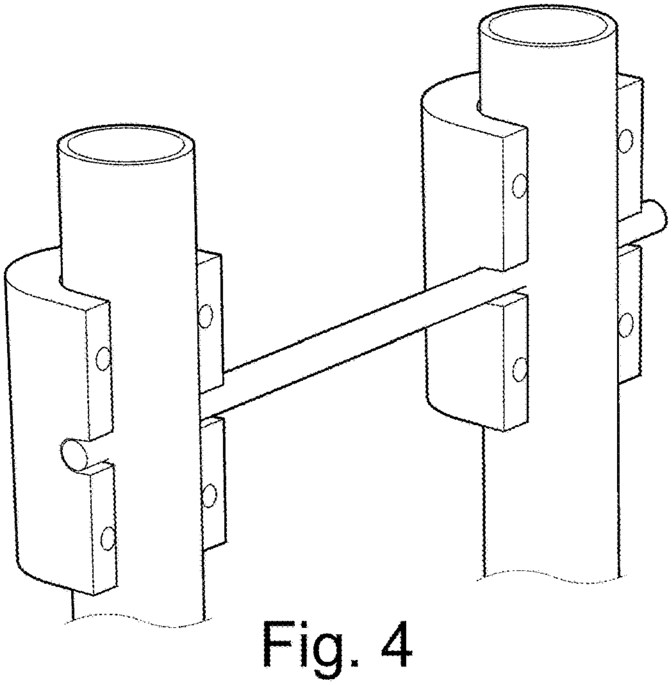

Although not shown in FIG. 1, a corrosion resistant security bar is positioned across the container doors. A suitable security bar assembly is shown in FIGS. 2, 3 and 4. The assembly comprises an elongate bar, made from a corrosion-resistant metal such as 316 stainless steel (also known as A4 Stainless) which has U-shaped recess at each end. The bar is secured across the doors of the container by the recessed U-sections being received within curved half-ring brackets attached to the door closing rods either side of the container doors. The security bar is held securely across the door when the closing rods extend into the half-ring brackets, in front of the bar.

The shipping container 2 is such that there is at least one sensor device 14 on at least one of the locking bars 12. The sensor device 14 operates wirelessly to transmit to a control station data indicating an unauthorised attempt to open at least one of the doors 6, 8. The shipping container 2 is also such that there is at least one GPS device 16 which is mounted on at least one of the locking bars 12. The GPS device 16 operates to indicate the global position of the shipping container 2.

As can be seen from FIG. 1, there is a first one of the sensor devices 14 on a first locking bar 12 for the first door 6, and there is a second one of the sensor devices 14 on a second locking bar 12 for the second door 8. The first door 6 has another locking bar 12 which is not provided with the sensor device 12. Similarly, the second door 8 has another locking bar 12 which is not provided with one of the sensor devices 14. In modifications of the invention, one of the sensor devices 14 could be provided on all of the locking bars 12, or on a combination of three out of the four locking bars 12.

The GPS sensor device 16 is shown as being formed as part of the sensor device 14. In modifications of the invention, the GPS device 16 could be formed separately from the sensor device 14, in which case the GPS sensor device 16 could be positioned on one or both of the locking bars 12 on the doors 6, 8 that are not provided with the sensor device 14. Alternatively, the GPS sensor device 16, when separate from the sensor device 14, could be provided on the same locking bars 12 that have the sensor devices 14.

As shown in FIG. 1, the first end 10 of the container body 4 has a corner abutment member 18 at each of the four corners of the rectangular first end 10 of the container body 4. As shown in FIGS. 1 and 3, each of the doors 6, 8 has three transversely extending recessed portions 21. As also shown in FIGS. 1 and 3, the sensor devices 14 are located in the two central recessed portions 21. As best appreciated from FIG. 3, the sensor devices 14 are configured to be thinner than the combined thickness of the depth of the recessed portion 21 plus the protruding thickness of the corner abutment members 18. The sensor devices 14 are thus able to be mounted on their locking bars 12 in a protection space 20 created by the depth of the recessed portions 21 and the thickness of the corner abutment members 18. Thus, the corner abutment members 18 operate with the recessed portions 21 to protect the sensor device 14 from shocks as might be caused by a plurality of the shipping containers 2 being loaded by crane onto a ship for transport by sea, or onto a lorry for transport by road, or onto a train for transport by train. In modifications of the invention, the sensor devices 14 can be located in any chosen one or more of the recessed portions 21. Also, the doors 6, 8 may each have more or less than the illustrated three recessed portions 21. Thus, for example each door 6,8 may have two, four or five of the recessed portions 21.

FIG. 4 shows how the sensor device 14 comprises a first part 22 and a second part 24. The first and second parts 22, 24 are U-shaped as shown. The first and second parts 22, 24 are able to secure together around a chosen one of the locking bars 12. The first part 22 has a plurality of securing pin 26. As shown, there are four of the security pins 26. Each security pin 26 locates in a blind bore 28 in the second part 24.

Figure 5:
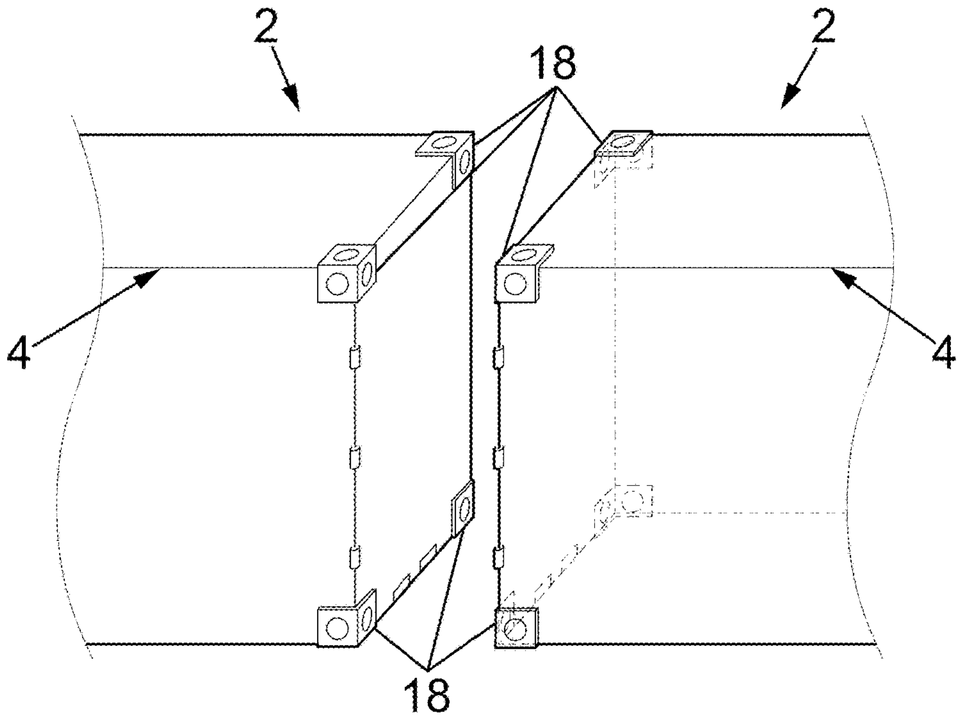
FIG. 5 shows two of the shipping containers as shown in FIG. 1 arranged end to end and with some parts for ease of illustration and understanding.

FIG. 5 shows a second sensor device 30 which is like the first sensor device 14 but shorter. Similar parts have been given the same reference numerals for ease of comparison and understanding. FIG. 5 shows the security pins 26 provided with a male member 31 which projects into a female member in the form of a recess. The male member 31 is wirelessly electronically controllable, for example by a radio transmitter, to move into and out of the recess for extra secure fixing purposes.

Figure 6:
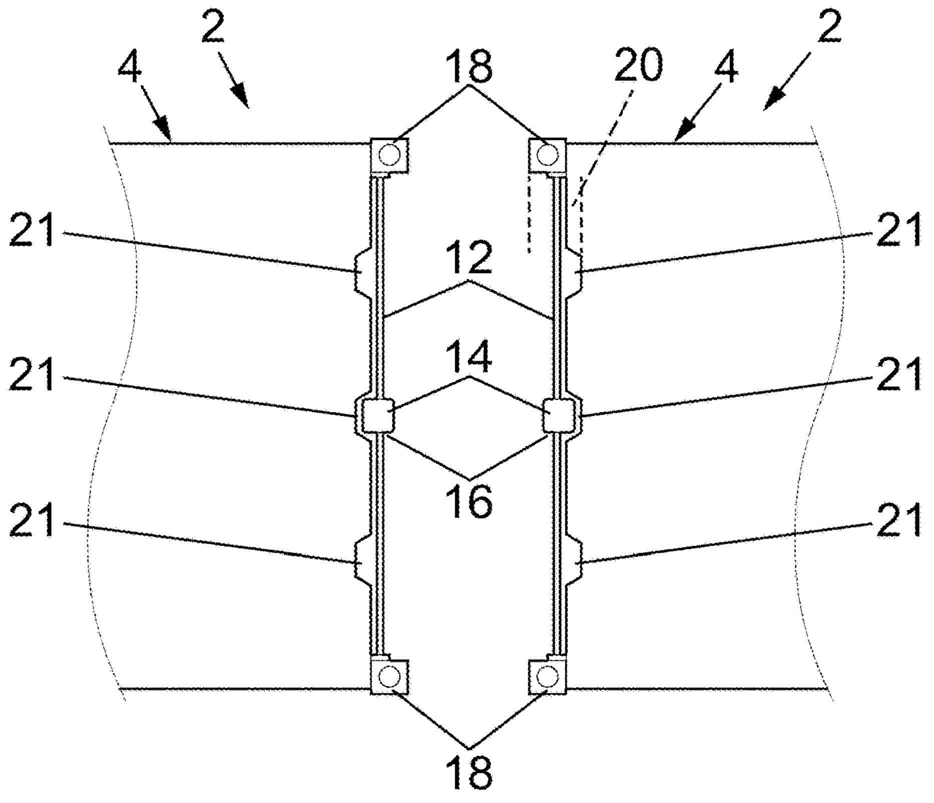
FIG. 6 is a side view of the two shipping containers shown in FIG. 5, and including the parts omitted in FIG. 5.
Figure 7:
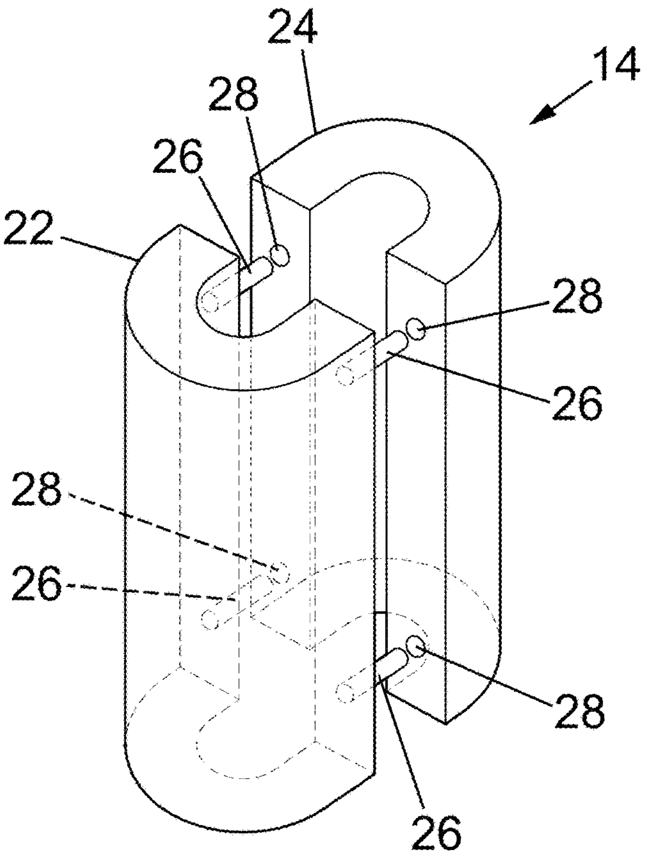
FIG. 7 is an exploded perspective view of a first sensor device.

FIGS. 6 and 7 show a third sensor device 32 which is like the sensor devices 14, 30. Similar parts have again been given the same reference numerals for ease of comparison and understanding. For reasons of extra security, the sensor device 32 is such that the securing pins 26 are formed as protrusions from support plates 34, 36. The bores 28 are also faced with a plate 38. The plates 34, 36, 38 help to resist attempts to break the first and second parts 22, 24 apart, for example by using a lever between the first and second parts 22, 24.

Figure 8:
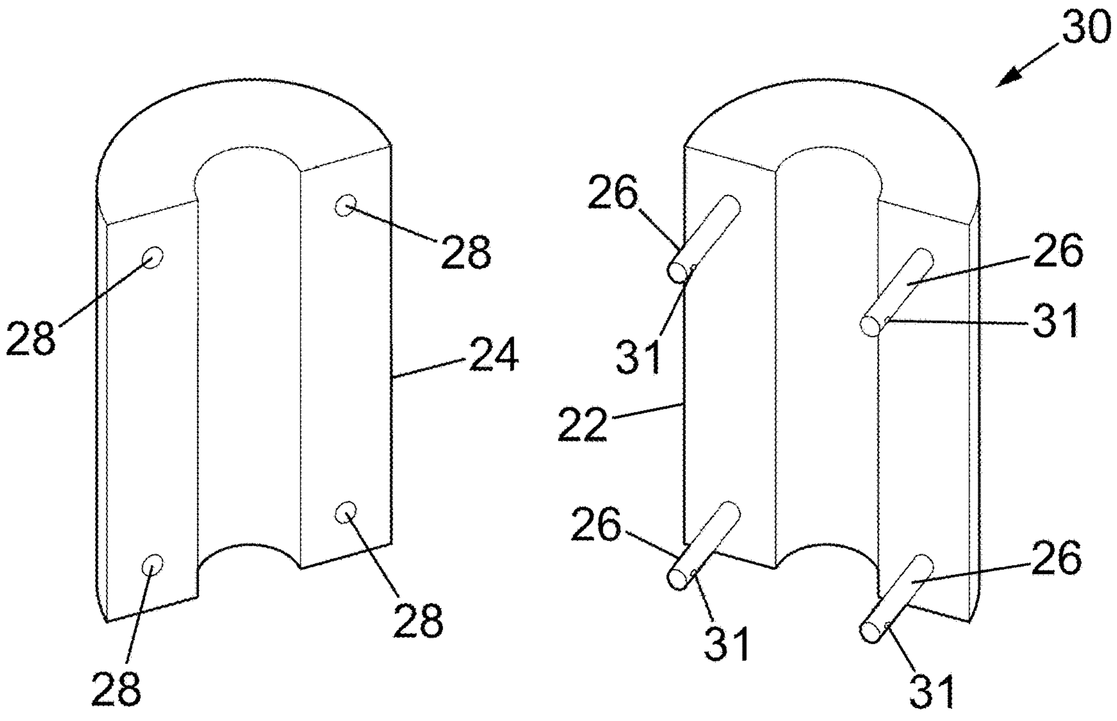
FIG. 8 is an exploded view of a second sensor device and one which is like the first sensor device but shorter.

FIG. 8 shows an alternative design of support plate 40. The support plate 40 is of a design which is an alternative to the support plate 34 or 36. The securing pins 26 have been shown.

Figure 9:
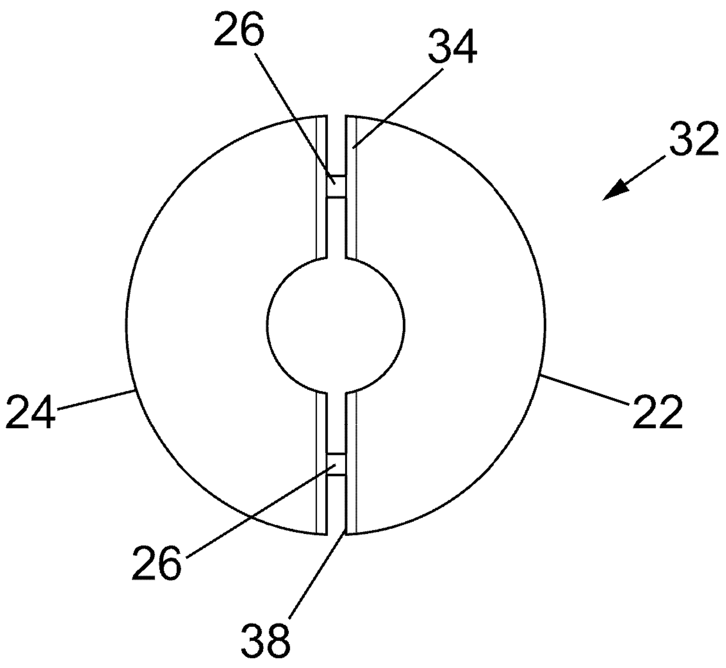
FIG. 9 is a top view of a third sensor device, and shows the sensor device when it is assembled together.
Figure 10:
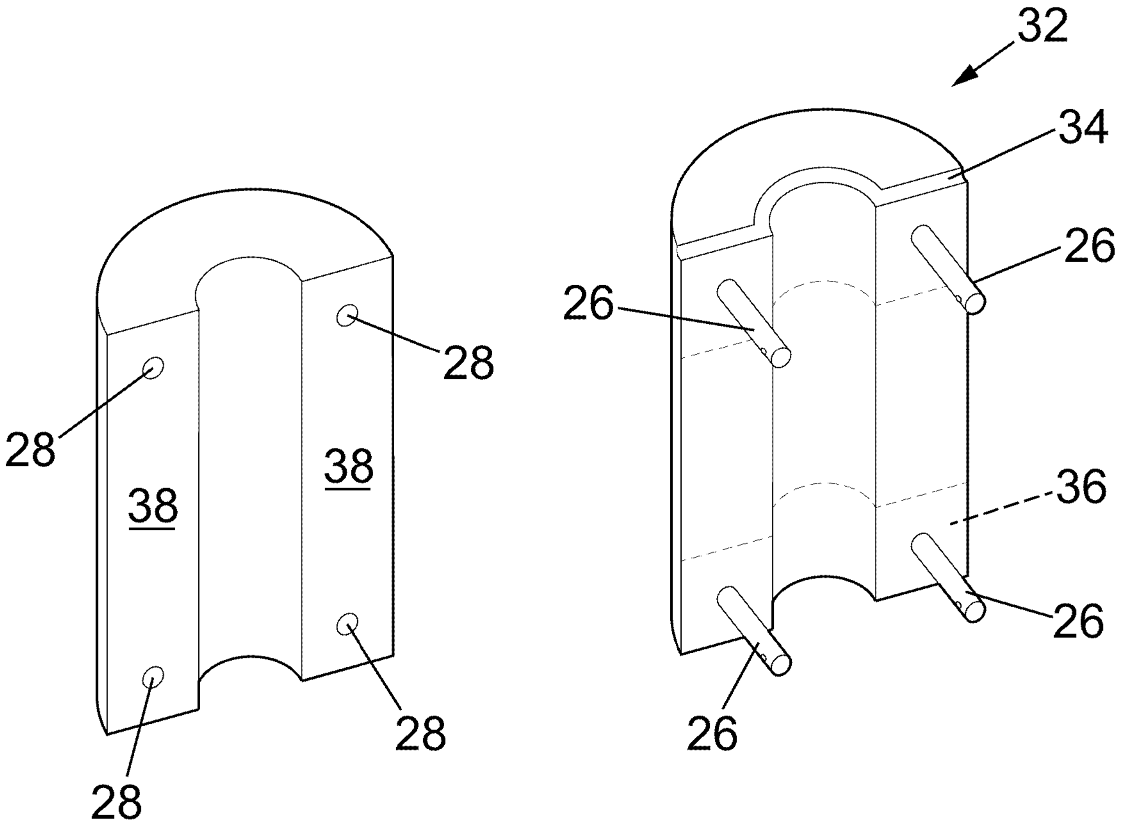
FIG. 10 shows part of the third sensor device shown in FIG. 9.
Figure 11:
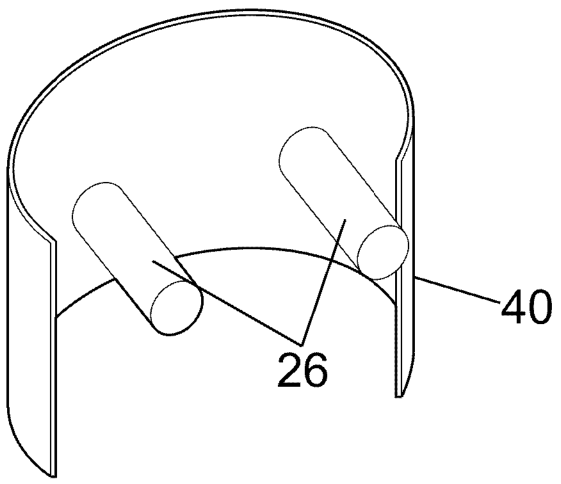
FIG. 11 shows a metal plate which is installed in the part of the sensor device which is shown in FIG. 10.

FIGS. 9, 10 and 11 show a fourth sensor device 42 comprising a first part 44 and a second part 46. The first part 44 is provided with securing straps 48 which fit around the locking bar 12 as shown. The first part 44 has securing pins 26, and the second part 46 has blind bores 28. The securing pins 26 and the blind bores 28 can be protected by support plates 34, 36, 38.

In FIGS. 6-11, the plates 34, 36, 38 may be made of any suitable materials including, for example, metals. Where the material is a metal, then the metal will typically be a metal that does not corrode, for example by rusting. If a metal that corrodes is used, then the metal may be provided with a protective plastics coating.

Figure 12:
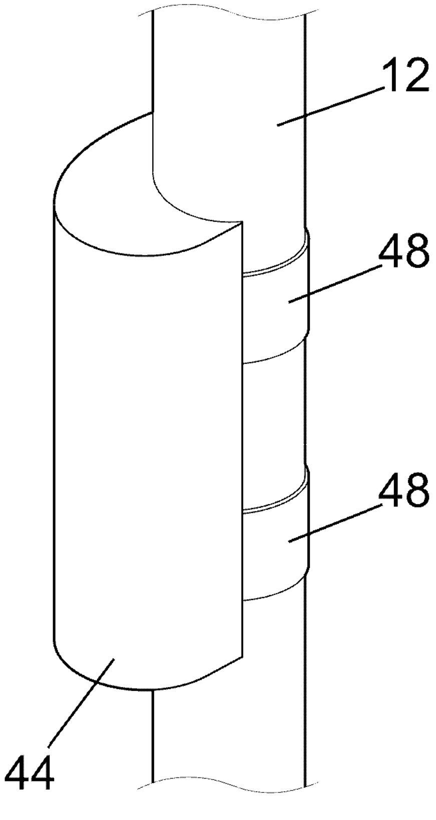
FIGS. 12 and 13 illustrate a fourth sensor device, and shows how the sensor device is able to be attached to a locking bar.

FIG. 12 shows a fifth sensor device 50 comprising a first part 52 and a second part 54. The first part 52 has two beads 56. The second part 54 has two longitudinally extending channels 58. The beads 56 slide in the channels 58. Thus the first and second parts 52, 54 are joined together by a sliding action rather than by a direct movement towards one another. The first and second parts 52, 54 can optionally be provided with securing pins or other securing formations 60 as shown.

Figure 13:
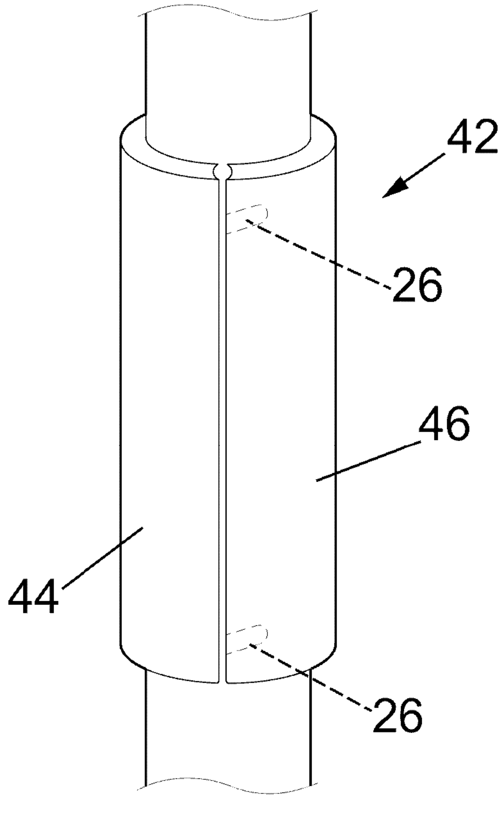
Figure 14:
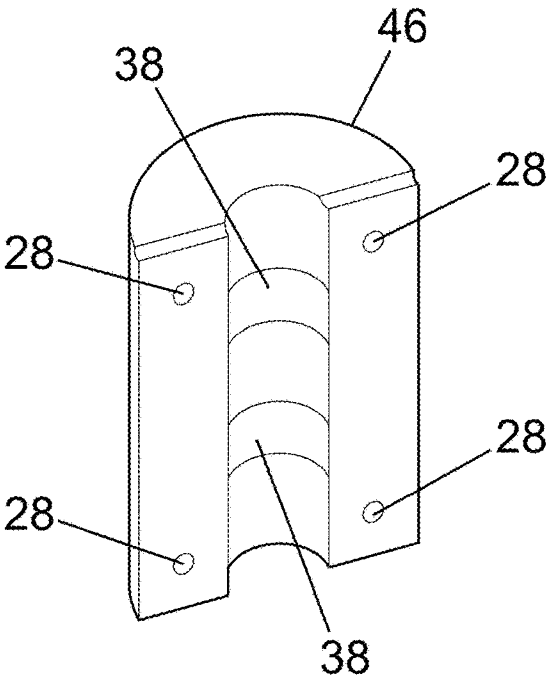
FIG. 14 is a view showing the inside of the sensor device shown in FIG. 12.
Figure 15:
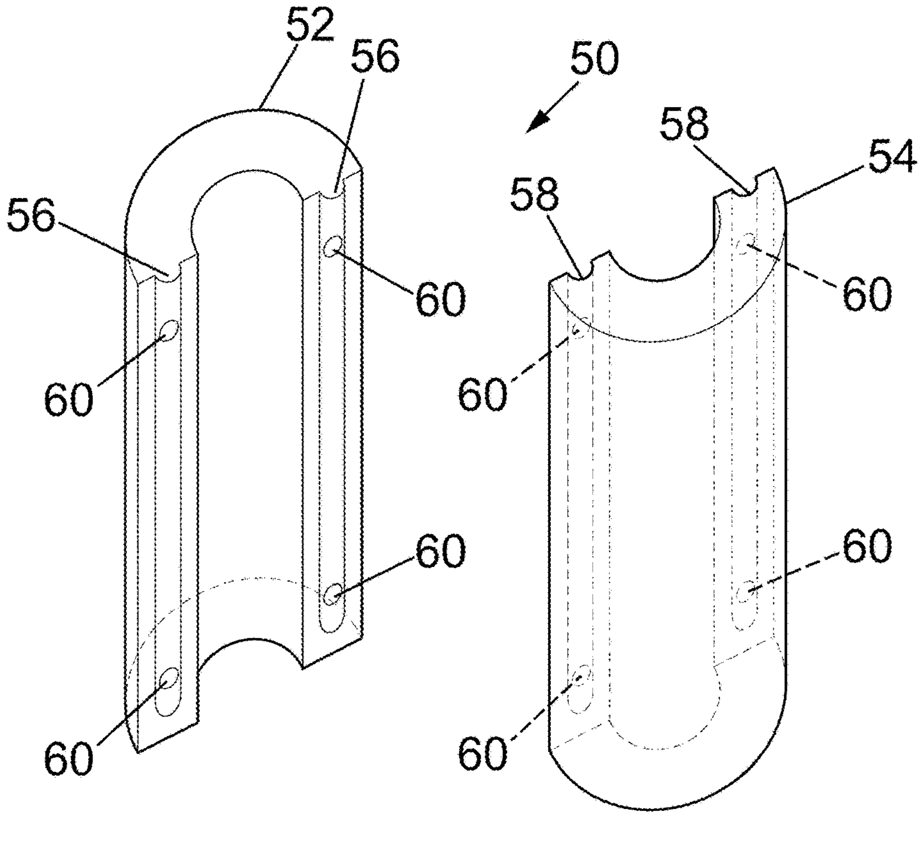
FIG. 15 is an exploded view of a fifth sensor device.
Figure 16:
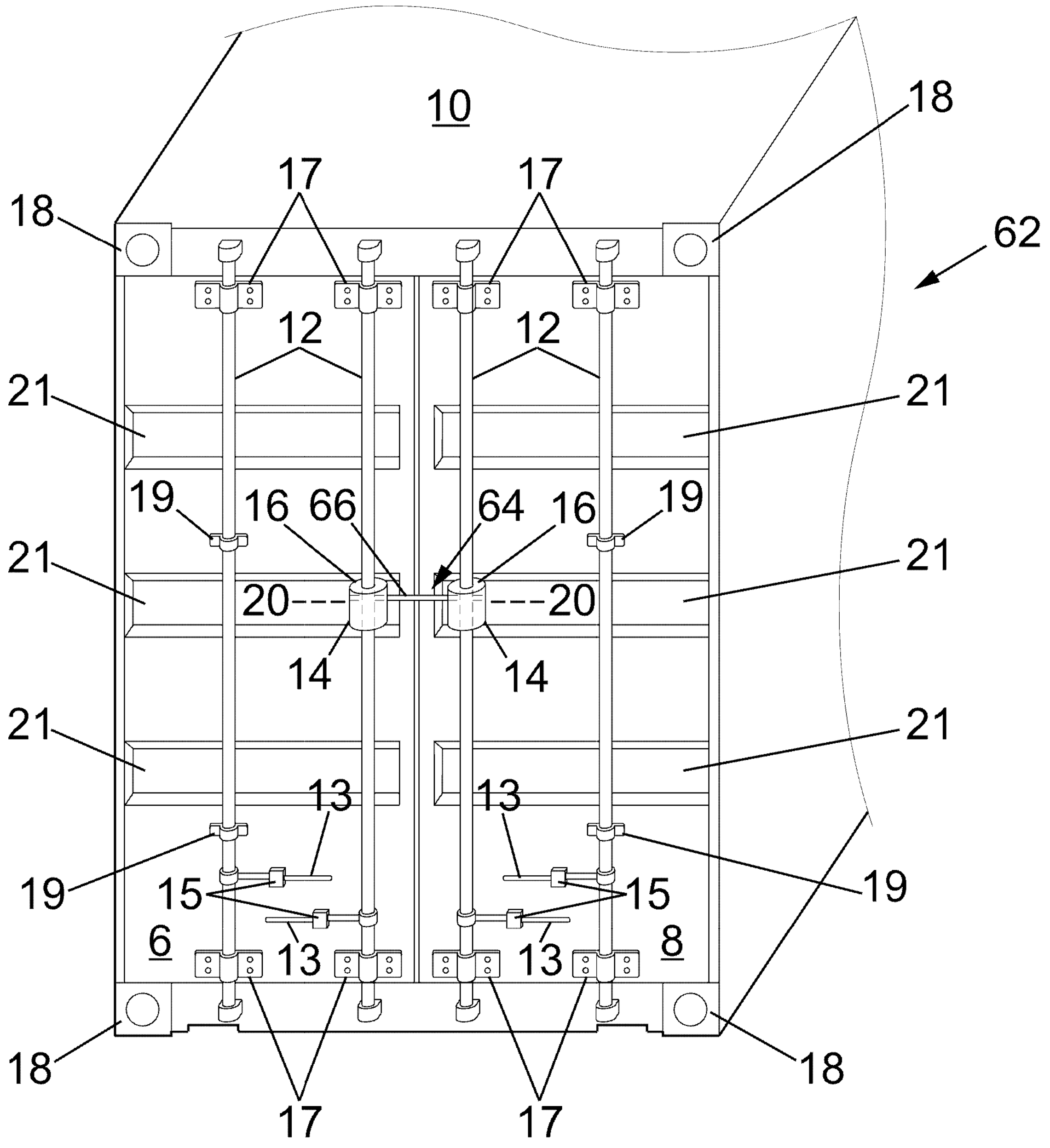
FIG. 16 is a shipping container like FIG. 1 but modified to include extra security in the form of a security bar.
Figure 17:
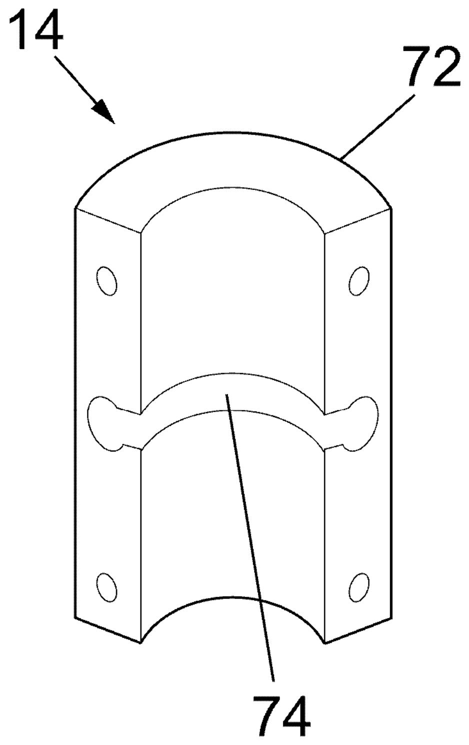
FIG. 17 shows in more detail the security bar shown in FIG. 16.
Figure 18:
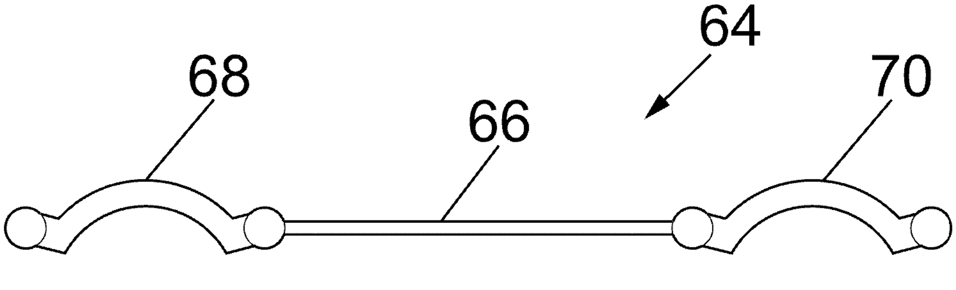
FIG. 18 shows how the security bar fits to a sensor.

Referring to FIGS. 13, 14 and 15, there is shown a shipping container 62 which is like the shipping container 2. Similar parts have been given the same reference numerals for ease of comparison and understanding. A security bar may also be utilised as described in the other embodiment. In the shipping container 62, it will be seen that the two sensor devices 14 have a security member in the form of a security rod 64 extending between them. The security rod 64 provides extra security because it needs to be removed by authorised personnel prior to authorised opening of the first door 6 and/or the second door 8. FIG. 14 shows how the security rod 64 has a straight part 66 and curved ends 68, 70. The straight part 66 extends between the curved rear parts 72 of two of the sensors 14. As shown, the curved rear part 72 has a groove 74 which receives the curved end 68. The curved end 70 is received in the rear part 72 of its sensor 14. Other types of security member may be employed so that, for example, the security member may be a security cable.

The sensor devices are able to be produced at commercially acceptable prices, and they are easily able to be fitted in position. They give good protection against unauthorised opening of the shipping container 2. The GPS device or devices that are employed enable the exact position of the shipping container 2 to be known at any time.

It is to be appreciated that the embodiments of the invention described above with reference to the accompanying drawings have been given by way of example only and that modifications may be affected. Thus, for example, different types of sensor devices and/or GPS devices to those shown may be employed. Individual components shown in the drawings are not limited to use in their drawings and they may be used in other drawings and in all aspects of the invention. The invention also extends to the individual components mentioned and/or shown above, taken singly or in any combination.

The invention claimed is:

1. A shipping container comprising:

(i) a container body for containing goods;

(ii) first and second doors which are positioned at a first end of the container body, and which move between open and closed positions for enabling storage and removal of the goods from the container body;

iii) first and second locking bars which extend longitudinally along an outside of the first and second doors respectively, and which operate to lock and unlock the doors;

(iv) a first sensor device which is mounted on the first locking bar, and a second sensor device which is mounted on the second locking bar, which operate wirelessly to transmit to a control station data indicating an unauthorized attempt to open at least one of the doors; and which are in communication with each other such as to trigger in response to unauthorized relative movement between the first and second doors; and (v) at least one global positioning satellite device which is mounted on at least one of the locking bars, and which operates to indicate the global position of the container.

2. The shipping container according to claim 1, in which there is a first one of the global positioning satellite devices on one of the locking bars for the first door.

3. The shipping container according to claim 2, in which there is a second one of the global positioning satellite devices on one of the locking bars for the second door.

4. The shipping container according to claim 1, in which the global positioning satellite device is formed as a part of the sensor device.

5. The shipping container according to claim 1, in which the first end of the container body has a corner abutment member at each of four corners of the first end of the container body, in which the first and second doors have at least one transversely extending recessed portion, and in which the sensor device is mounted on the locking bar on a part of the locking bar that passes over the transversely extending recessed portion, whereby the sensor device is mounted in a protection space created by a depth of the transversely extending recessed portion and a thickness of the corner abutment member.

6. The shipping container according to claim 1, in which the sensor device comprises a first part and a second part, and securing means for securing the first and second parts together around the locking bar.

7. The shipping container according to claim 6, in which the securing means comprises a plurality of securing pins.

8. The shipping container according to claim 7, in which each one of the securing pins has a male member which projects into a female member, and in which the male member is wirelessly electronically controllable to move it from a locked position in the female member to an unlocked position out of the female member.

9. The shipping container according to claim 1, in which the pins are mounted on one or more metal support plates.

10. The shipping container according to claim 1, in which the sensor device is configured such that electronic components in the sensor device are protected from adverse environmental conditions.

11. The shipping container according to claim 10, in which the electronic components are in an inner plastics mounded portion, and in which the inner plastics molded portion is protected by an outer plastics molded portion.

12. The shipping container according to claim 1, in which the sensor contains the global positioning satellite device, and in which the global positioning satellite device is activatable in the event that the container should fall off a ship if the container is being transported by the ship.

13. The shipping container according to claim 1, in which the sensor is able to transmit a picture of an inside of the container, before and after opening of the container and for comparison purposes.

14. The shipping container according to claim 1, in which there is a first one of the sensor devices on the first door, a second one of the sensor devices on a second door, and in which there is a security rod extending between the first and second sensor devices.

* * * * *